US009586384B2

United States Patent
Banerjee

(10) Patent No.: US 9,586,384 B2
(45) Date of Patent: Mar. 7, 2017

(54) MULTI-LAYER SHEET AND METHOD THEREOF

(75) Inventor: Mrinal Kanti Banerjee, Mumbai (IN)

(73) Assignee: Essel Propack Ltd., Mumbai, Maharashtra (IN)

( * ) Notice: Subject to any disclaimer, the term of this patent is extended or adjusted under 35 U.S.C. 154(b) by 51 days.

(21) Appl. No.: 13/816,222

(22) PCT Filed: Aug. 8, 2011

(86) PCT No.: PCT/IN2011/000518
§ 371 (c)(1),
(2), (4) Date: Feb. 8, 2013

(87) PCT Pub. No.: WO2012/020426
PCT Pub. Date: Feb. 16, 2012

(65) Prior Publication Data
US 2013/0136908 A1   May 30, 2013

(30) Foreign Application Priority Data

Aug. 10, 2010   (IN) .......................... 2254/MUM/2010

(51) Int. Cl.
*B32B 27/08* (2006.01)
*B32B 27/30* (2006.01)
*B32B 27/32* (2006.01)

(52) U.S. Cl.
CPC .............. *B32B 27/08* (2013.01); *B32B 27/30* (2013.01); *B32B 27/306* (2013.01); *B32B 27/32* (2013.01);
(Continued)

(58) Field of Classification Search
CPC ....... B32B 27/08; B32B 27/30; B32B 27/306; B32B 27/32; B32B 2255/10;
(Continued)

(56) References Cited

U.S. PATENT DOCUMENTS 4,239,826 A * 12/1980 Knott et al. .................. 428/36.7
4,399,173 A *  8/1983 Anthony ................. B32B 27/32
                                                  264/176.1
(Continued)

FOREIGN PATENT DOCUMENTS

DE        101 53 210 A1    5/2003
EP         0 524 486 A1    1/1993
(Continued)

OTHER PUBLICATIONS

PCT International Search Report for PCT Counterpart Application No. PCT/IN2011/000518, 4 pages, (Jan. 24, 2012).
(Continued)

*Primary Examiner* — Aaron Austin
*Assistant Examiner* — Laura Figg
(74) *Attorney, Agent, or Firm* — Blakely, Sokoloff, Taylor & Zafman LLP

(57) ABSTRACT

The present invention in provides a multilayer sheet comprising a poly vinyl alcohol (PVOH) layer only as an oxygen barrier layer. The multilayer sheet comprises an outer layer and an inner layer wherein the poly vinyl alcohol (PVOH) layer is sandwiched. The present invention also provides an environmental friendly method for manufacturing a multilayer sheet comprising preparing aqueous emulsion of the polyvinyl alcohol and applying over the outer sheet and drying the same at about 100-120° C. This multilayer sheet can be recycled very efficiently as the percentage of polyethylene is more than 90%.

13 Claims, 1 Drawing Sheet

(52) U.S. Cl.
CPC ....... *B32B 2255/10* (2013.01); *B32B 2255/26* (2013.01); *B32B 2307/31* (2013.01); *B32B 2307/7244* (2013.01); *Y10T 428/24975* (2015.01); *Y10T 428/273* (2015.01); *Y10T 428/31913* (2015.04)

(58) Field of Classification Search
CPC ............ B32B 2255/26; B32B 2307/31; B32B 2307/7244; Y10T 428/24975; Y10T 428/273; Y10T 428/31913
USPC .................................................. 428/216, 518
See application file for complete search history.

(56) References Cited

U.S. PATENT DOCUMENTS

| | | | | | |
|---|---|---|---|---|---|
| 4,927,689 | A | * | 5/1990 | Markiewicz | B65D 65/42 428/34.8 |
| 5,399,429 | A | * | 3/1995 | Asrar | 428/364 |

FOREIGN PATENT DOCUMENTS

| | | |
|---|---|---|
| WO | WO 96/16799 A1 | 6/1996 |
| WO | WO 2004/033200 A1 | 4/2004 |
| WO | WO 2005/030478 A1 | 4/2005 |

OTHER PUBLICATIONS

PCT Notification of Transmittal of the International Preliminary Report on Patentability (Chapter II of the Patent Cooperation Treaty) for PCT Counterpart Application No. PCT/IN2011/000518, 14 pages, (Aug. 8, 2012).

\* cited by examiner

MULTI-LAYER SHEET AND METHOD THEREOF

CROSS-REFERENCE TO RELATED APPLICATIONS

This patent application is a U.S. National Phase Application under 35 U.S.C. 371 of International Application No. PCT/IN2011/000518, filed Aug. 8, 2011, entitled MULTI-LAYER SHEET AND METHOD THEREOF, which claims priority to Indian Patent Application No. 2254/MUM/2010, filed Aug. 10, 2010.

FIELD OF INVENTION

The present invention relates to a multilayer sheet and particularly to a multilayer laminated sheet used for preserving food grade products and a process thereof.

BACKGROUND OF INVENTION

The multilayer sheets are used for making tube as well as pouches for paste, cream, gel and powder products that are sensitive to moisture and oxygen. Generally, a multilayer laminated sheet comprises an outside thermoplastic layer, a barrier layer and inner thermoplastic layer.

Traditionally, a metal foil such as aluminum foil is used as a barrier layer. However, a barrier layer of metal foil with lower gauge (below 20 micron) has more number of pin holes causing poor gas barrier. Moreover, metal foil is susceptible to flex cracking causing further deterioration of barrier properties. Presently, polyethylene terephthalate (polyester), polyamide (PA), Ethylene Vinyl Alcohol (EVOH) polymers are used as barrier layers. However, a barrier layer of polyethylene terephthalate (polyester), polyamide (PA), are suitable for only medium barrier (more than 10 $cc/m^2$) application. Further, though EVOH is a good barrier, it needs minimum thickness (10 micron or more) to achieve effective gas barrier.

Further, a common greater disadvantage of presently available multilayer sheets is in reprocessing and recycling as these multi layer sheets are made of dissimilar polymers and polymer with metal foil.

SUMMARY OF THE INVENTION

Hence there is a need of a multilayer sheet which is eco-friendly and recyclable and a method of producing the said multilayer sheet.

In one embodiment, the present invention provides a multilayer sheet, comprising an outer layer of thermoplastic polymer, an oxygen barrier layer, and an inner layer of thermoplastic polymer wherein poly vinyl alcohol (PVOH) layer is applied as the oxygen barrier layer only for allowing substantially more than 90% recycle of the thermoplastic polymer of the multilayer sheet.

In another embodiment, the present invention provides a method for manufacturing a multilayer sheet comprising steps of coating a poly vinyl alcohol as an oxygen barrier only over the outer thermoplastic layer, extruding a laminating layer over the polyvinyl alcohol layer and co-extruding a sealant layer of thermoplastic polymer.

The multilayer sheet of the present invention is eco-friendly and has a water vapor transmission rate (WVTR) of less than one (<1.0/m2/24 hrs./38° C./100% rh) and Oxygen transmission rate (OTR) is less than one (<1.0/m2/24 hrs./23° C./0% rh).

BRIEF DESCRIPTION OF THE DRAWINGS

The various embodiments of the present invention will now be described with reference to the accompanying drawings, which are given by way of example and are not to be taken as limiting in any way. The accompanying drawings are intended to make the invention easier to understand wherein.

DETAILED DESCRIPTION OF THE INVENTION

Figure 1:
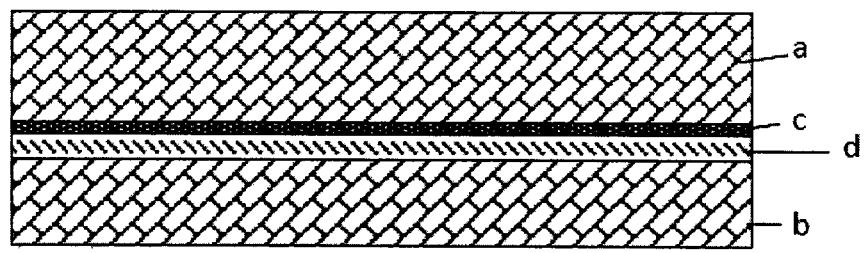
FIG. 1 shows a multilayer sheet having single film of each layer according to the present invention.

The present invention in general provides a multilayer sheet comprising a poly vinyl alcohol (PVOH) layer only as an oxygen barrier layer. The multilayer sheet comprises an outer layer and an inner layer wherein the poly vinyl alcohol (PVOH) layer is sandwiched.

The present invention also provides a method for manufacturing a multilayer sheet comprising preparing aqueous emulsion of the polyvinyl alcohol and applying over the outer sheet and drying the same at about 100-120° C. After coating of the poly vinyl alcohol over the outer thermoplastic layer, a laminating layer extrudes over the polyvinyl alcohol layer which is followed by co-extrusion of a sealant layer. The sealant layer may be coated with polyvinyl layer before co-extruding over the laminating layer.

According to the present invention, aqueous emulsion of the polyvinyl alcohol (PVOH) is done with a water based formulation. The water based formulation of the polyvinyl alcohol (PVOH) is very well known in the art and will be understood by those skilled in the art(s).

According to the present invention, the outer layer of thermoplastic layer is a known thermoplastic layer such as low density polyethylene (LDPE), medium density polyethylene(MDPE), high density polyethylene(HDPE), linear low density polyethylene(LLDPE), blend of high density and linear low density polyethylene(HDPE+LLDPE), blend of linear low density and low density polyethylene(LLDPE+LDPE).

According to the present invention, the inner layer comprises an extrusion/coating/laminating layer (herein after referred to as 'laminating layer') and a sealant layer.

According to the present invention, the laminating layer is selected from a family of higher melt flow index (MFI) polymer such as low density polyethylene, acrylic co-polymer of polyethylene and maleic anhydride grafted polymers. The necessity of application of laminating layer is very well known in the art and will be understood by those skilled in the art(s).

According to the present invention, the sealant polymer is a layer of polyethylene selected from a group of low density polyethylene (LDPE), medium density polyethylene (MDPE), high density polyethylene(HDPE), linear low density polyethylene(LLDPE), blend of high density and linear low density polyethylene(HDPE+LLDPE), blend of linear low density and low density polyethylene(LLDPE+LDPE).

According to the present invention, no curing time is required for laminated sheet and is ready for secondary operation immediately off the lamination process.

According to the present invention, the thickness of multilayer sheet of the present invention comprising individual or mono layer of each film can be as minimum as 25 micron and dry weight polyvinyl alcohol (PVOH) coating layer (c) may be 0.5 to 2.0 gram per m².

The multilayer sheet of the present invention has a water vapor transmission rate (WVTR) of less than one (<1.0/m2/24 hrs./38° C./100% rh) and Oxygen transmission rate (OTR) is less than one (<1.0/m2/24 hrs./23° C./0% rh).

According to the present invention, various combination of the multilayer sheet can be formed as per the requirement.

An example of the sheet having single film of each layer is shown in FIG. 1. The sheet consists of film layer (a) coated with water base Poly vinyl alcohol (PVOH) primer (c), extrusion coated and laminated (d) with sealant film (b). Film layers (a), (b) & (d) all are from thermo plastic Polyethylene family. Multilayer structure thus produced has layer configuration (a-c-d-b).

Figure 2:
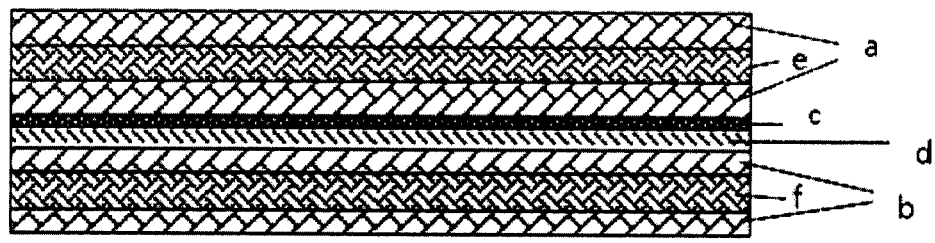
FIGS. 2 and 3 shows a multilayer sheet according to the present invention having inner and outer layers comprising more than one film layer.

Another example of the multilayer sheet according to the present invention is shown in FIG. 2, the outer film and the sealant film have been made with three (3) layer combination i.e. (a-e-a) and (b-f-b). Introduction of three layers film on either side of Poly vinyl alcohol (PVOH) coating further enhance the moisture and gas barrier properties of the sheet. Multilayer structure thus produced has a layer configuration a-e-a-c-b-f-b. Multilayer sheet construction as shown in FIG. 2 can be constructed with outer and sealant film having multilayer co-extrusion technology and layer ratio starting 1:1:1 up to 1:8:1.

Figure 3:
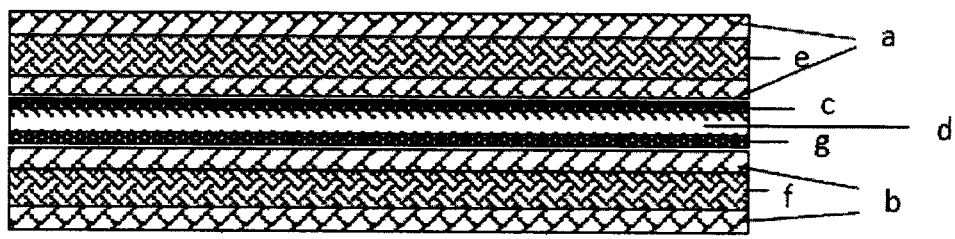

Another example of the multilayer sheet is shown in FIG. 3 wherein outer film and sealant film comprises three (3) layer combination i.e. (a-e-a) and (b-f-b). A first poly vinyl alcohol coating layer is applied on layer (c) and a second Poly vinyl alcohol (PVOH) coating is applied on layer (g) on the sealant film. Two layers of Poly vinyl alcohol (PVOH) coating (c) & (g) further enhances the moisture and gas barrier properties of the composite sheet. Multilayer structure thus produced having layer configuration (a-e-a-c-d-g-b-f-b).

The multilayer sheet construction as shown in FIG. 3, can be constructed with a permutation and combination of monolayer outer film and sealant film (a), (b) or multilayer film (a-e-a) and (b-f-b), two (2) layers of Poly vinyl alcohol (PVOH) coating (c) & (g), either mono or tandem coated extrusion coated layer (d).

According to the present invention a multilayer sheet having thickness 50 to 500 micron can be manufactured wherein thickness of outer layer and sealant layer thickness can be vary from 40-225 micron and the thickness of extrusion coated layer can be between 0.5-50 micron.

A multilayer sheet of the present invention thus manufactured exhibits excellent moisture and gas barrier. This helps keep the packed product fresh for longer time. Moreover, the sheet can be recycled very efficiently as the percentage of polyethylene is more than 90%. Further, the present invention completely eliminates use of EVOH and other oxygen barrier layers for making the multilayer sheet. Moreover, the oxygen barrier layer is poly vinyl alcohol which is a food grade chemical and the sheet is safe for storing the food materials. Another attribute of the extrusion coated multilayer barrier sheet is that the entire method of manufacturing is solvent free. Therefore, the method can be termed as environmental friendly.

The present invention can be understood better with the help of the following exemplary descriptive example:

Various Polyethylene (PE) films with the blend of LDPE/LLPE/MDPE/HDPE of 40-200 micron are produced using mono layer or multilayer co-extrusion blown film machine with 0.6-2.2 m film width. These films are then coated with Poly vinyl alcohol as barrier coating material 0.5-2.0 gm/m² dry weight. Thus coated films are then oven dried and taken for further process of extrusion lamination. Thus single coated layer of PE films are then extrusion laminated with another Polyethylene film to produced a multilayer film according to the present invention. All the multilayer comprises more than 90% polyethylene which can be recover by using recover technology. A typical configuration is explained below with the help of FIG. 3 for explanation:

| Sr. No. | LAYER CONFIGURATION | THICKNESS (Micron) | W/W % |
|---|---|---|---|
| 1 | Outer Layer include three films of PE (a + e + a) | 120 | 95.13 |
|  | Sealant layer includes 3 films of PE (b + f + b) | 120 |  |
|  | LDPE extrusion of PE (d) | 20 |  |
| 2 | PVOH coating (c & g) 0.5 micron each | 1.0 | 0.47 |
| 3 | Pigments (not shown) | 5 | 4.40 |
|  | Total | 266 | 100% |

The nouns inner and outer layer are referred in the description for the purpose of the understanding and nowhere limit the invention. The extrusion process, co extrusion process and the application process of emulsion layer over a layer are very well known in the art and will be understood by those skilled in the art(s), hence, not require to describe in detailed. While the present invention has been described with respect to certain preferred embodiments, it will be apparent to those skilled in the art that various changes and modification may be made without departing from the scope of the invention as defined in the following claims:

What is claimed is:

1. A multilayer sheet, comprising:
an outer layer of thermoplastic polymer, wherein the outer layer is made mono or multilayer of polyethylene only;
an oxygen barrier layer; and
an inner layer of thermoplastic polymer, wherein the inner layer comprises a multilayer of polyethylene only and comprises an extrusion or coating or laminating layer, and further comprises a sealant layer, wherein the oxygen barrier layer is made of a layer of poly vinyl alcohol (PVOH) only and is layered directly next to the outer layer of thermoplastic polymer without an intervening layer between the oxygen barrier layer and the outer layer of thermoplastic polymer, wherein the multilayer sheet includes greater than 90% polyethylene.

2. The multilayer sheet as claimed in claim 1, wherein the multilayer sheet does not contain Ethylene Vinyl Alcohol.

3. The multilayer sheet as claimed in claim 1, wherein a dry weight of PVOH is 0.5 to 2.0 gm/m².

4. The multilayer sheet as claimed in claim 1, wherein the polyethylene selected from a group consisting of low density polyethylene (LDPE), medium density polyethylene (MDPE), high density polyethylene (HDPE), linear low density polyethylene (LLDPE), blend of high density and linear low density polyethylene (HDPE+LLDPE), blend of linear low density, and low density polyethylene (LLDPE+LDPE).

5. The multilayer sheet as claimed in claim 1, wherein said extrusion or coating or laminating layer can be a multi layer of a polymer selected from a group consisting of higher melt flow index (MFI) polymer including low density polyethylene, acrylic co-polymer of polyethylene and maleic anhydride grafted polymers.

6. The multilayer sheet as claimed in claim 1, wherein thickness of the multilayer sheet can be as low as 50 micron.

7. The multilayer sheet as claimed in claim 1, wherein preferable thickness of outer layer and sealant layer can be vary from 40-225 micron and the preferable thickness of extrusion coated layer can be between 0.5-50 micron.

8. A method for manufacturing a multilayer sheet comprising:
    providing an outer thermoplastic layer, wherein the outer thermoplastic layer is made mono or multilayer of polyethylene only;
    coating a polyvinyl alcohol layer as an oxygen barrier only over the outer thermoplastic layer without an intervening layer between the polyvinyl alcohol layer and the outer thermoplastic layer;
    extruding a laminating layer over the polyvinyl alcohol layer; and
    co-extruding a sealant layer of thermoplastic polymer over the laminating layer and the sealant comprises a multilayer of polyethylene only,
    wherein the poly vinyl alcohol layer is made of a layer of poly vinyl alcohol (PVOH) only, and the multilayer sheet includes greater than 90% polyethylene.

9. The method as claimed in claim 8, wherein the polyvinyl alcohol layer can be coated over the sealant layer of the thermoplastic before co-extruding over the laminating layer.

10. The method as claimed in claim 8, wherein coating the poly vinyl alcohol layer over the outer thermoplastic layer comprises
    preparing aqueous emulsion by polymerization of a monomer vinyl alcohol;
    applying polyvinyl alcohol layer over the outer or sealant thermoplastic layer; and
    drying the layer at about 100-120° C.

11. The method as claimed in claim 8, wherein a dry weight of the polyvinyl alcohol is 0.5 to 2 gm/m$^2$.

12. The method as claimed in claim 8, wherein said polyethylene selected from a group consisting of low density polyethylene (LDPE), medium density polyethylene (MDPE), high density polyethylene (HDPE), linear low density polyethylene (LLDPE), blend of high density and linear low density polyethylene (HDPE+LLDPE), blend of linear low density and low density polyethylene (LLDPE+LDPE).

13. The method as claimed in claim 8, wherein said laminating layer can be mono or multi layer of a polymer selected from a group consisting of higher melt flow index (MFI) polymer including low density polyethylene, acrylic co-polymer of polyethylene and maleic anhydride grafted polymers.

\* \* \* \* \*